May 15, 1945.　　　H. QUIGLEY　　　2,376,007

LAWN SPRINKLER

Filed Aug. 16, 1944

Inventor
Herbert Quigley
By Liverance and
Van Antwerp
Attorneys

Patented May 15, 1945

2,376,007

UNITED STATES PATENT OFFICE 2,376,007

LAWN SPRINKLER

Herbert Quigley, Grand Rapids, Mich., assignor to National Brass Company, Grand Rapids, Mich., a corporation of Michigan Application August 16, 1944, Serial No. 549,650

6 Claims. (Cl. 299—64)

The present invention relates to a lawn sprinkler of the rotary type, and it is the primary object and purpose of the present invention to produce a novel rotary sprinkler in which the distance of the projection of water from the ends of the sprinkler arms may be varied and controlled so as to sprinkle square or rectangular areas or other areas having corners therein without limiting to sprinkling circular areas alone. Sprinklers of the circular type are well known, and the present invention is advantageous, particularly in connection with lawns which have right angle corners and with edges of the lawn lying alongside sidewalks so that in order to reach the extremities of the corners of the lawn wastage of water does not occur as with the usual rotary sprinkler.

A further object of the invention is to provide a simple, novel and durable construction in which a sealing against leakage of water through the bearing where the rotary member of the sprinkler turns about its support is obtained automatically through the pressure of the water from the water main; and such sealing effect progressively increases with an increase in the pressure of the water so that under all conditions of use an effective seal against escape of water is had.

Figure 1:
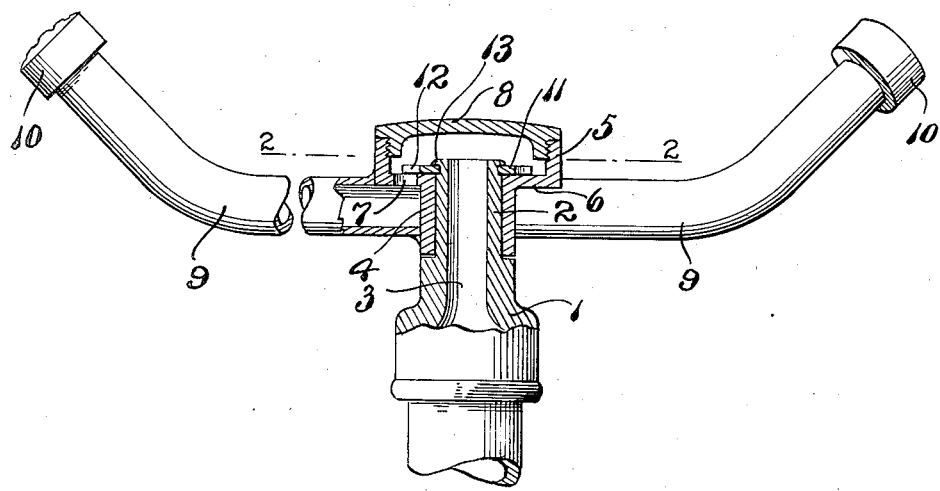
Figure 2:
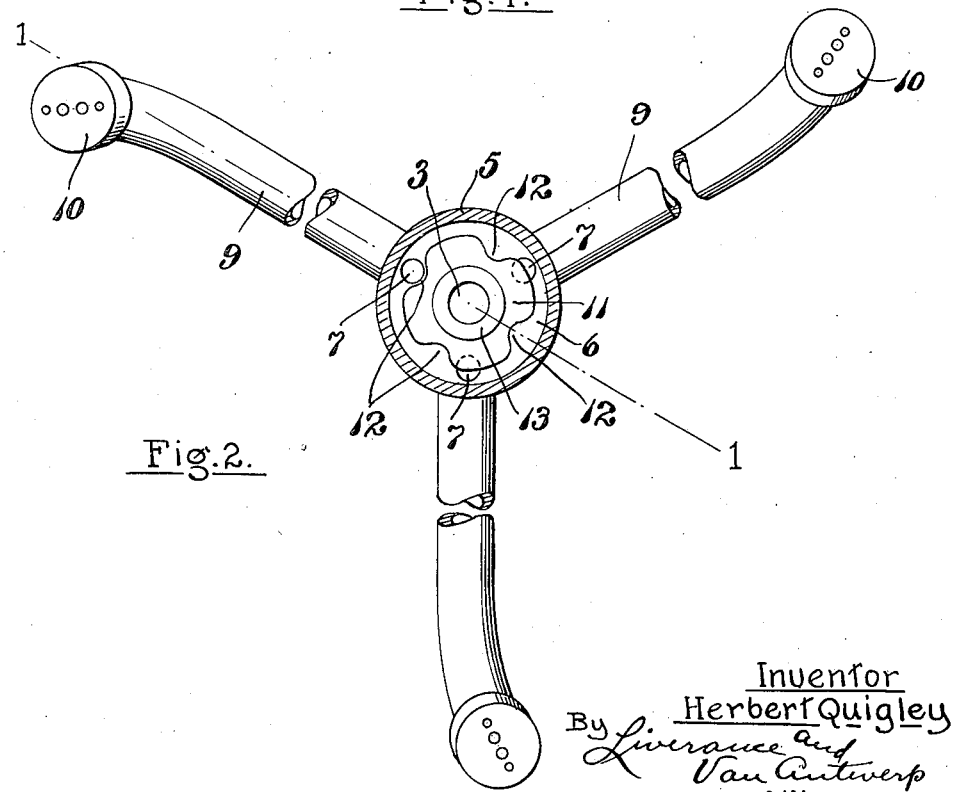

An understanding of the invention may be had from the following description taken in connection with the accompanying drawing, in which, Fig. 1 is a transverse section and partial elevation, the section being substantially on the plane of line 1—1 of Fig. 2, and Fig. 2 is a plan and horizontal section on the plane of line 2—2 of Fig. 1 looking in a downward direction.

Like reference characters refer to like parts in the different figures of the drawing.

The central support 1 of the sprinkler at its upper end is reduced in diameter to provide a bearing sleeve 2, there being a longitudinal central opening 3 for the passage of water to the revolving sprinkler head. Said support 1 has a connection at a lower part thereof to a hose or the like through which water is supplied under pressure.

Around the reduced diameter of the upper sleeve portion 2 the rotating sprinkler is mounted to turn about a vertical axis. It includes in its construction a sleeve 4 which sits over the part 2 and has a free rotative movement thereon, said sleeve at its upper end being continued as a housing having a short vertical cylindrical wall 5 and a horizontal bottom 6. Through the bottom 6 at a plurality of spaced apart points vertical openings 7 are made which, while shown as of circular outline, may be of different forms in outline without departing from the invention. The housing 5 is closed at its upper end by a closure cap 8 as shown in Fig. 1. Radially extending arms extend outwardly one at each of the openings 7, there being communication between the inner chamber of the housing described through said openings 7 with all of the arms 9. The outer portions of the arms are turned or bent upwardly and at their outer ends are provided with caps 10 with outlet openings therethrough of the proper size and disposed at a proper angle such that water under pressure passing therethrough tends to rotate the head about the bearing sleeve 2.

The upper end of the sleeve 2 extends above the bottom 6 of the housing described, and a control plate or disk 11 of flat metal provided at its edges with spaced apart recesses 12 is permanently secured to the upper end of the sleeve as shown at 13 to make a permanent connection. In the structure shown there are four of the recesses 12 which may be in accordance with the somewhat concaved shape illustrated in the drawing, or recesses of a different shape may be resorted to without departing from the invention.

In the operation water under pressure enters the housing chamber underneath the closure cap 8 and passes through the openings 7 in greater or less amounts depending upon how much of the areas of said openings are covered by the plate 11. For example in Fig. 2 one of the openings 7 are completely uncovered and the other two are partially covered by the plate. In all cases a portion of all openings 7 will be uncovered for the passage of water, but a less quantity will flow through an opening 7 which is partially covered than will flow through an opening which is fully uncovered. The greater the quantity of water which flows the greater will be its projection outwardly from the sprinkler arm 9. That is the distance that the water is projected from the outer ends of any sprinkler arm will progressively increase as the opening is progressively uncovered until it is fully open, and will likewise progressively decrease when a fully opened opening 7 is progressively brought underneath the plate 11. Accordingly, under such operation, the water will be projected outwardly varying distances by each of the sprinkler arms, going outwardly to the greatest distance as the successive openings associated with the sprinkler arms reach their fully open position.

With a control plate 11 as shown in Fig. 2 with four of the recesses at 12, there will be four positions in which the water projected from the outer ends of each of the arms is projected at its maximum with a decreasing projection between said outermost or maximum projection limits. Therefore with a proper design of the shape of plate 11 an approximate square area may be sprinkled.

The pressure of the water against the cap 8 serves to lift the sprinkler head in an upward direction and bring the face of the base 6 of the housing against the under side of the plate 11. The greater the pressure of the water the greater will be the pressure of the base 6 against said plate. Therefore such pressure against the plate 11 brings the parts 6 and 11 into close engagement and seals against the escape of water between said bottom 6 and plate 11 and thence downwardly and outwardly between the sleeves 2 and 4. If the water pressure is lowered the sealing pressure is not so great but correspondingly the pressure tending to force the water to leak at the hub of the sprinkler is decreased.

It is evident that the number of sprinkler arms may be increased or decreased with a corresponding increase or decrease of the number of recesses 12 in the disk or plate 11. With two sprinkler arms and three of the recesses a corner angle of 60° may be sprinkled or in other words, an area having the shape of an equilateral triangle covered by the water projected from the sprinkler. Other geometric areas such as a pentagon or hexagon may be sprinkled by increasing the number of recesses in the plate 11. However, in normal practice, square areas rather than other polygonal forms will normally be what are to be sprinkled. The invention however is not to be limited to the structural form shown and described but is to come within the scope comprehended by the appended claims.

I claim:

1. In a construction as described, a support having a central passage therethrough for the passage of water under pressure, a rotary member including a chambered housing and a sleeve extending from a side of the housing around and rotatable about said support, said side of said housing having openings therethrough, a disk located at the inner side of said side of the housing and permanently connected with the support, said disk having a plurality of peripheral recesses therein, hollow arms connected with said sleeve and housing, one for each opening in the said side of the housing for communication between said arms and the interior of the housing, said arms extending radially, and nozzle outlet means at the outer ends of the arms.

2. A construction as defined in claim 1, the number of recesses in said plate exceeding the number of openings through the said side of the housing.

3. A construction as defined in claim 1, said openings in the said side of the housing being so located relative to the recesses in said plate that when an opening is located directly at a recess in the plate it is fully opened for the passage of water, and when located between successive recesses in the plate the opening is partially covered to reduce the passage of water therethrough.

4. In a construction as described, a vertical support having an axial passage therethrough, a rotary spray member mounted on said support at its upper portion to turn about a vertical axis, said rotary spray including a chambered housing into the chamber of which water under pressure may be carried through said support, the lower side of said housing having a plurality of water passing openings therethrough, a disk secured at the upper end of the support within said housing and bearing against the inner side of the lower side thereof, said disk having a plurality of spaced recesses therein around the periphery thereof, the portions of said disk between said recesses partially covering the openings and the openings being entirely open when disposed at said recesses in the plate and a plurality of radially extending tubular arms connected with said chambered housing, one in conjunction with each of the openings at the lower side thereof, said tubular arms at their outer ends having spray heads with water passing openings therethrough.

5. In a construction of the class described, a vertical support having a vertical axial passage therethrough for conducting water under pressure, a spray head rotatably mounted about the upper end portion of said support, said head including a chambered housing into the chamber of which water is adapted to be delivered through said support and from the lower side of which a sleeve extends located around the upper end portion of the support, said housing at its lower side having a plurality of spaced openings therethrough, hollow spray arms connected with the housing and extending radially therefrom, one at each of said openings, and means connected with the upper end of the support within said housing for controlling the quantity of water passing from the chamber of said housing into the openings and into said arms and for sealing against the escape of water between the support and said sleeve.

6. In a construction of the class described, a rotatably mounted spray head, a support upon which the spray head is mounted, said support being adapted to conduct water therethrough to and within the spray head, said spray head having a chamber into which the water is conducted, hollow arms extending from the spray head, there being communication between said chamber and said arms, and a plate connected with said support within said chamber for sealing against leakage of water from the chamber between said spray head and its support.

HERBERT QUIGLEY.